United States Patent
Hough (10) Patent No.: US 9,808,119 B1
(45) Date of Patent: Nov. 7, 2017

(54) GRILL APPARATUS THAT RAISES AND LOWERS COAL GRATE TO AND AWAY FROM FOOD GRILL

(71) Applicant: Andrew D. Hough, Cedar, MN (US)

(72) Inventor: Andrew D. Hough, Cedar, MN (US)

(*) Notice: Subject to any disclaimer, the term of this patent is extended or adjusted under 35 U.S.C. 154(b) by 287 days.

(21) Appl. No.: 14/538,593

(22) Filed: Nov. 11, 2014

Related U.S. Application Data (60) Provisional application No. 62/051,239, filed on Sep. 16, 2014.

(51) Int. Cl.
  *A47J 37/00* (2006.01)
  *A47J 37/07* (2006.01)
(52) U.S. Cl.
  CPC .................. *A47J 37/0731* (2013.01)
(58) Field of Classification Search
  CPC ............. A47J 2037/0795; A47J 37/0731
  USPC ........................ 126/25 A, 25 R, 9 R
  See application file for complete search history.

(56) References Cited

U.S. PATENT DOCUMENTS

| | | | |
|---|---|---|---|
| 3,217,634 A | 11/1965 | Fox | |
| 3,398,733 A * | 8/1968 | Bradley | A47J 37/0704 110/240 |
| 3,696,800 A | 10/1972 | Close, Jr. | |
| 3,943,837 A | 3/1976 | Trkla | |
| 4,094,295 A * | 6/1978 | Boswell | A47J 37/0704 126/25 R |
| 4,281,633 A | 8/1981 | Wackerman | |
| 4,334,462 A * | 6/1982 | Hefling | A47J 37/0713 126/25 R |
| 4,382,432 A | 5/1983 | Lizdas | |
| 4,852,476 A | 8/1989 | Sanchez | |
| 5,113,699 A * | 5/1992 | Soriano | A47J 37/0745 126/25 R |
| 5,154,159 A | 10/1992 | Knafelc et al. | |
| 5,758,635 A | 6/1998 | Petersen | |
| 5,809,988 A * | 9/1998 | Wagner | A47J 37/0704 126/25 A |
| 5,878,739 A | 3/1999 | Guidry | |
| 6,609,512 B2 | 8/2003 | Poe, Jr. et al. | |
| 7,779,828 B2 | 8/2010 | Lu | |
| 2002/0185122 A1* | 12/2002 | Bossler | A47J 37/0704 126/519 |
| 2008/0197138 A1* | 8/2008 | Flather | A47J 36/2444 220/592.16 |
| 2012/0266855 A1 | 10/2012 | Chung | |

* cited by examiner

*Primary Examiner* — Vivek Shirsat (57) ABSTRACT

A grill apparatus that raises and lowers a coal grate to and away from a food grill. The grill apparatus includes an oven having a bottom oven portion in the shape of an upright bowl, a top oven portion in the shape of an inverted bowl, and a middle portion in the shape of a cylinder. A cranking of a handle outside of the oven rotates a shaft running through the oven. The shaft spools up and spools out a tether engaged to the coal grate to draw a heat source on the coal grate to and away from food items on the food grill.

18 Claims, 6 Drawing Sheets

GRILL APPARATUS THAT RAISES AND LOWERS COAL GRATE TO AND AWAY FROM FOOD GRILL

This application claims the benefit under 35 U.S.C. 119(e) of U.S. Provisional Patent Application No. 62/051,239 filed Sep. 16, 2014, which is hereby incorporated by reference in its entirety into this application.

FIELD OF THE INVENTION

The present invention generally relates to kettle grills, particularly to charcoal kettle grills, and specifically to charcoal kettle grills having a cylindrical middle oven portion.

BACKGROUND OF THE INVENTION

An oven is an enclosed compartment, chamber or receptacle for cooking and heating food, or roasting or baking or barbequing food, or drying food. An oven may or may not be thermally insulated.

One type of oven is a kettle grill. The kettle grill derives its name from the lower chamber of a conventional kettle. The kettle grill may be used at a barbeque.

A barbeque may be defined as a meal or gathering at which meat, fish or other food is cooked out of doors on a rack over an open fire or on a portable grill. A rack is a framework, typically with rails, bars, hooks, or pegs, for holding or storing things. A grill is a metal framework used for cooking food over a heat source such as an open fire.

SUMMARY OF THE INVENTION

A feature of the present invention is the provision in a grill apparatus, of an oven.

Another feature of the present invention is the provision in a grill apparatus, of an oven having a bottom oven portion, a top oven portion, and a middle oven portion.

Another feature of the present invention is the provision in a grill apparatus, of the bottom oven portion being shaped like an upright bowl.

Another feature of the present invention is the provision in a grill apparatus, of the top oven portion being shaped like an inverted bowl.

Another feature of the present invention is the provision in a grill apparatus, of the middle oven portion being shaped like a cylinder.

Another feature of the present invention is the provision in a grill apparatus, of the top oven portion being on the middle oven portion, and of the middle oven portion being on the bottom oven portion.

Another feature of the present invention is the provision in a grill apparatus, of an oven having a grate and a grill.

Another feature of the present invention is the provision in a grill apparatus, of one of the grate and grill being above the other of the grate and grill.

Another feature of the present invention is the provision in a grill apparatus, of at least one of the grate and grill being disposable at different heights relative to the other of the grate and grill.

Another feature of the present invention is the provision in a grill apparatus, of the grill being fixed at a given height and the grate being raised and lowered relative to the grill.

Another feature of the present invention is the provision in a grill apparatus, of the grill being fixed at a given height and the grate being incrementally raised and incrementally lowered relative to the grill.

Another feature of the present invention is the provision in a grill apparatus, of the grill being fixed at a given height and the grate being drawable up and let down relative to the grill.

Another feature of the present invention is the provision in a grill apparatus, of the grill being fixed at a given height and the grate being spoolable up and spoolable out and down relative to the grill.

Another feature of the present invention is the provision in a grill apparatus, of the grill being fixed at a given height and the grate being hoisted up and down or winched relative to the grill.

Another feature of the present invention is the provision in a grill apparatus, of a guide where the guide includes a male and female arrangement between the oven and the grate and where the male and female arrangement includes an axis set at a right angle relative to the grate.

Another feature of the present invention is the provision in a grill apparatus, of a crankable handle and a train where the crankable handle is outside of the oven, where the train is engaged to the oven and between the crankable handle and the grate, and where the train raises and lowers the grate and operates when the handle is cranked.

Another feature of the present invention is the provision in a grill apparatus, of a rotatable shaft and a tether, the rotatable shaft being engaged to the oven, the tether being engaged between the rotatable shaft and the grate, and the grate being raised and lowered when the rotatable shaft is rotated to spool up and to spool out the tether.

Another feature of the present invention is the provision in a grill apparatus, of a piece engaged to the rotatable shaft, the piece being offset from the axis of rotation of the rotatable shaft, the piece including a handle for rotating said rotatable shaft, the piece having a mass, and the mass of the piece being sufficiently great such that the grate is lowered only when the handle is manually cranked to rotate the rotatable shaft and such that the grate is not automatically lowered by gravity.

Another feature of the present invention is the provision in a grill apparatus, of a piece engaged to the rotatable shaft, the piece being offset from the axis of rotation of the rotatable shaft, the piece including a handle for rotating said rotatable shaft, the piece having a mass, and the mass of the piece being greater than a mass of the grate such that the grate is lowered only when the handle is manually cranked to rotate the rotatable shaft and such that the grate is not automatically lowered by gravity.

Another feature of the present invention is the provision in a grill apparatus, of a first annular base for the grate, of a second annular base for the grill, and of a male and female arrangement between the first and second annular bases, the male and female arrangement maintaining the grate and grill co-axial when the grate and grill are raised and lowered relative to each other.

Another feature of the present invention is the provision in a grill apparatus, of the middle oven portion being removable from the bottom oven portion, of the top oven portion being removable from the middle oven portion, of the grate being removable from the oven, and of the grill being removable from the oven.

Another feature of the present invention is the provision in a grill apparatus, of the grate being disposable at different heights in the middle oven portion.

Another feature of the present invention is the provision in a grill apparatus, of the grill being disposable at a first height adjacent to the top oven portion, of the grate being disposable at a second height adjacent to the grill, of the grate being disposable at a third height adjacent to the bottom oven portion, of the first height being greater than the second height, and of the second height being greater than the third height.

Another feature of the present invention is the provision in a grill apparatus, of a rotatable shaft and a tether, of the rotatable shaft being engaged to the oven, of the tether being engaged between the rotatable shaft and the grate, of the grate being raised and lowered when the rotatable shaft is rotated to spool up and to spool out the tether, and of the shaft running horizontally between the grate and grill.

Another feature of the present invention is the provision in a grill apparatus, of the oven being substantially closeable to outside air.

Another feature of the present invention is the provision in a grill apparatus, of a second grate, the second grate being disposable in the bottom oven portion.

Another feature of the present invention is the provision in a grill apparatus, of an oven where the oven includes a bottom oven portion, a top oven portion, and a middle oven portion, the middle oven portion being on the bottom oven portion, the top oven portion being on the middle oven portion, the oven being substantially closeable to outside air, of a grate in the oven, of a first annular base for the grate, of a grill in the oven where the grill is disposed above the grate and where at least one of the grate and grill is disposable at different heights relative to the other of the grate and grill, of a second annular base for the grill, of the middle oven portion being removable from the bottom oven portion, of the top oven portion being removable from the bottom oven portion, of the grate being removable from the oven, of the first annular base being removable from the grate and being removable from the oven, of the grill being removable from the oven, and of the second annular base being removable from the grill and being removable from the oven.

Another feature of the present invention is the provision in a grill apparatus, of an oven where the oven includes a bottom oven portion, a top oven portion, and a middle oven portion, the middle oven portion being on the bottom oven portion, the top oven portion being on the middle oven portion, of the bottom oven portion having a shape of an upright bowl, of the top oven portion having a shaped of an inverted bowl, of the middle oven portion having a cylindrical shape, of a grate in the oven where the grate includes a first annular perimeter that includes a first diameter less than a diameter of the cylindrical inner surface of the middle oven portion, of a grill in the oven where the grill is disposed above the grate and where the grill includes a second annular perimeter that includes a second diameter less than a diameter of the cylindrical inner surface of the middle oven portion, of a rotatable shaft engaged to the oven, of a tether between the rotatable shaft and the grate, and of a handle engaged to the rotatable shaft where the handle is outside the oven and where the handle when cranked incrementally raises and lowers the grate to different heights relative to the grill.

Another feature of the present invention is the provision in a grill apparatus, of diametrically opposed brackets engaging guide posts, which in turn engage guide tubes, which in turn engage the coal grate such that the coal grate is stabilized as the coal grate is winched up and down.

Another feature of the present invention is the provision in a grill apparatus, of a set of spaced apart brackets that serve as platforms for supporting the food grill, where such brackets are fixed to the inside of a cylindrical main body of the grill apparatus.

An advantage of the present invention is that food can be cooked or kept at a certain temperature for a given amount of time and then can be cooked or kept at a different temperature for a given amount of time, and that such change can be made without manipulating food or disturbing coal heating the food. A cook merely needs to crank a handle that rotates a shaft that raises or lowers a coal grate.

Another advantage of the present invention is that a difference between two cooking temperatures may be great or small. The handle may be cranked once to slightly raise or slightly lower the coal grate to slightly increase or slightly decrease the temperature at which the food is being cooked. The handle may be cranked several times to even further raise the coal grate or even further lower the coal grate to even further increase or even further decrease the temperature at which the food is being cooked.

Another advantage of the present invention is a one-handed operation for temperature control. Only one hand is required to crank the handle to rotate the shaft to raise or lower the coal grate. The other hand is available for use. For example, the other hand may lift the lid or top oven portion. The food may be manipulated with the other hand.

Another advantage is that, to adjust the heat of cooking, the amount of fuel remains the same. In other words, to increase the heat of cooking, a valve is not opened. More fuel is not burned. To decrease the heat of cooking, a valve is not closed. Rather, the heat source is maintained at one intensity and the distance of the heat source relative to the food is increased and decreased.

Another advantage is that coal is not disturbed while the coal grate is gently raised or gently lowered. Smoke, ash and sparks are not generated or are minimized when the coal grate is raised and lowered.

Another advantage is that the food is not disturbed when the cooking temperature is raised and lowered. The rotatable shaft and tethers operate at a level below the level of the food grill.

Another advantage of the present invention is a one step operation. To raise or lower the grate having coal, only one operation is performed. This operation is cranking the handle that rotates the rotatable shaft that spools up or lets out the line engaged to the coal grate.

Another advantage of the present invention is that the coal grate is never locked. A relatively heavy piece extends radially from the rotatable shaft. This relatively heavy piece includes the handle that is cranked to rotate the rotatable shaft. The mass or weight of this relatively heavy piece, including the handle, is greater than the mass or weight of the coal grate having a greater than normal load of coal thereon such that the relatively heavy piece, when released from being cranked by a hand, falls under gravity to a position where the relatively heavy piece extends downwardly and vertically from the rotatable shaft. The mass or weight of this relatively heavy piece, including the handle, is greater than the mass or weight of the coal grate having a greater than normal load of coal thereon such that the relatively heavy piece more than counterbalances such loaded coal grate such that the loaded coal grate does not unspool the rotatable shaft under the influence of gravity.

Another advantage of the present invention is that the coal grate is stable and remains horizontal when raised and lowered. One feature contributing to this advantage is the male/female arrangement between the coal grate and the oven in which the coal grate is raised and lowered. The male/female arrangement includes a guide post and a guide tube and preferably includes a pair of guide posts being respectfully received in a pair of guide tubes where the post/tube combinations are set diametrically opposite one another.

Another advantage of the present invention is that the coal grate is simple and easy to raise and lower. The relatively heavy piece that includes the handle is relatively long to provide leverage for a relatively large load of coal on the coal grate.

Another advantage of the present invention is that the coal grate may be raised in relatively small increments. The rotatable shaft is relatively small in diameter such that one rotation of the rotatable shaft may raise or lower the coal grate less than an inch. The rotatable shaft is of sufficiently great diameter such that the time it takes for the coal grate to be completely raised or completely lowered is not excessive.

Another advantage of the present invention is that the grill apparatus may be easily cleaned. The top oven portion, or lid, is removable from the middle oven portion. The middle oven portion is removable from the bottom oven portion. The grate and grill are removable from the oven. First and second annular bases are removable from the oven and from their respective grate and grill. The grate is removable from the tethers that raise and lower the grate. The first and second guide posts are removable from their respective first and second guide tubes such that the first and second annular bases are removable from each other. The rotatable shaft is removable from the middle oven portion. The tethers are removable from the rotatable shaft.

Another advantage of the present invention is that heat is distributed evenly throughout the bottom, middle and top oven portions regardless of the location of the coal grate that can be raised and lowered.

Another advantage of the present invention is that venting may be provided if desired.

Another advantage of the present invention is that venting may be shut off if desired. The present grill apparatus, with vents closed, is substantially a closed chamber or closed oven. In other words, the annular connection between the bottom and middle oven portions is a substantially sealed connection. The annular connection between the middle oven portion and top oven portion is a substantially sealed connection. The vents can be substantially closed against airflow. The connections between the middle oven portion and the rotatable shaft are substantially sealed connections. Given such, the oven of the grill apparatus permits inside pressure to be relieved so as to minimize the chance of explosions. One way inside pressure is relieved is by such connections being imperfect. Another way such inside pressure is relieved is by the top oven portion or lid being merely set up the middle oven portion, instead of being screwed thereupon in the nature of a pressure cooker.

DETAILED DESCRIPTION

Figure 1:
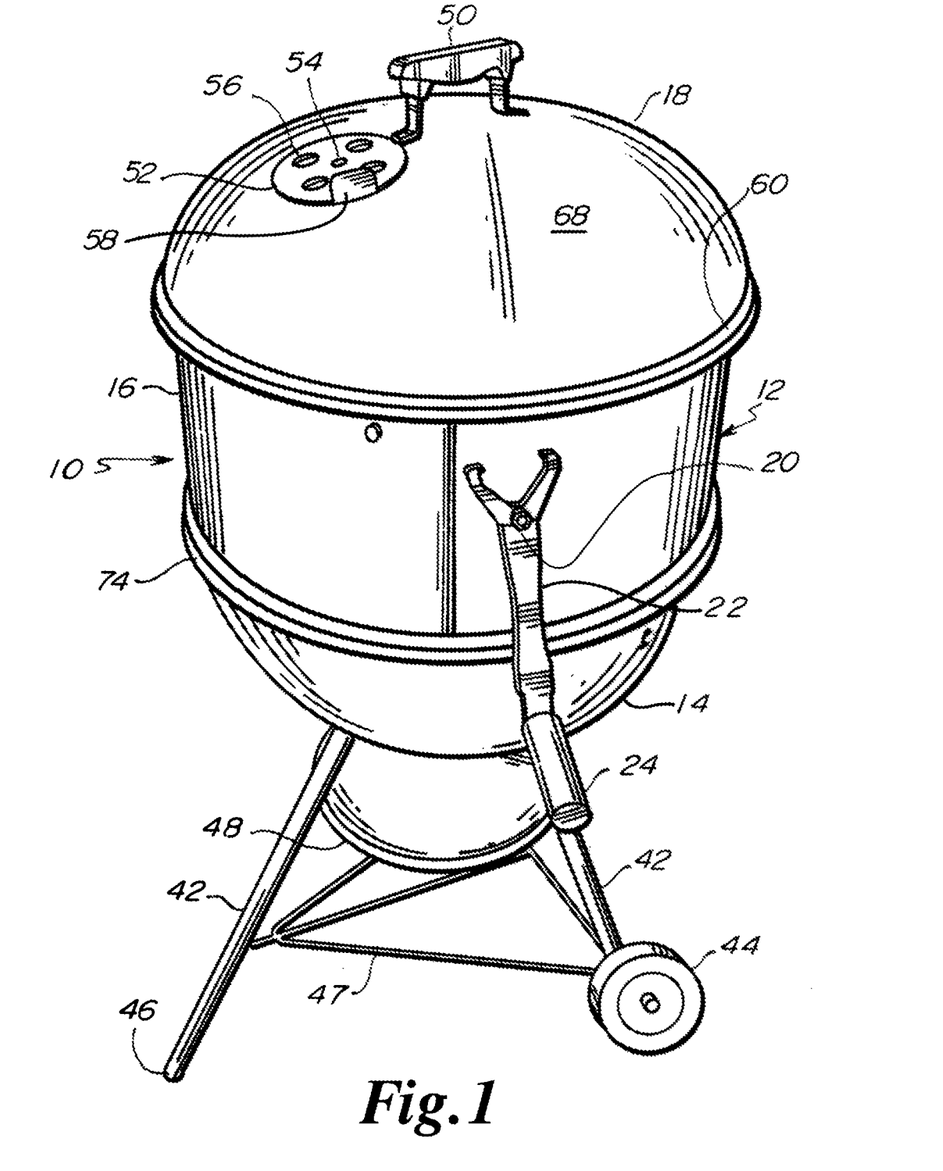
FIG. 1 is a perspective view of the present grill apparatus.

As shown in FIG. 1, the present grill apparatus is shown by reference number 10. Grill apparatus 10 includes an oven 12. The oven 12 includes a bowl shaped bottom oven portion 14, a cylindrically shaped middle oven portion 16, and an inverted bowl shaped top oven portion or lid 18. Grill apparatus 10 further includes a rotatable shaft 20 extending into the oven 12 and a relatively heavy piece 22 extending radially from the rotatable shaft 20. Relatively heavy piece 22 includes a handle 24.

Figure 2:
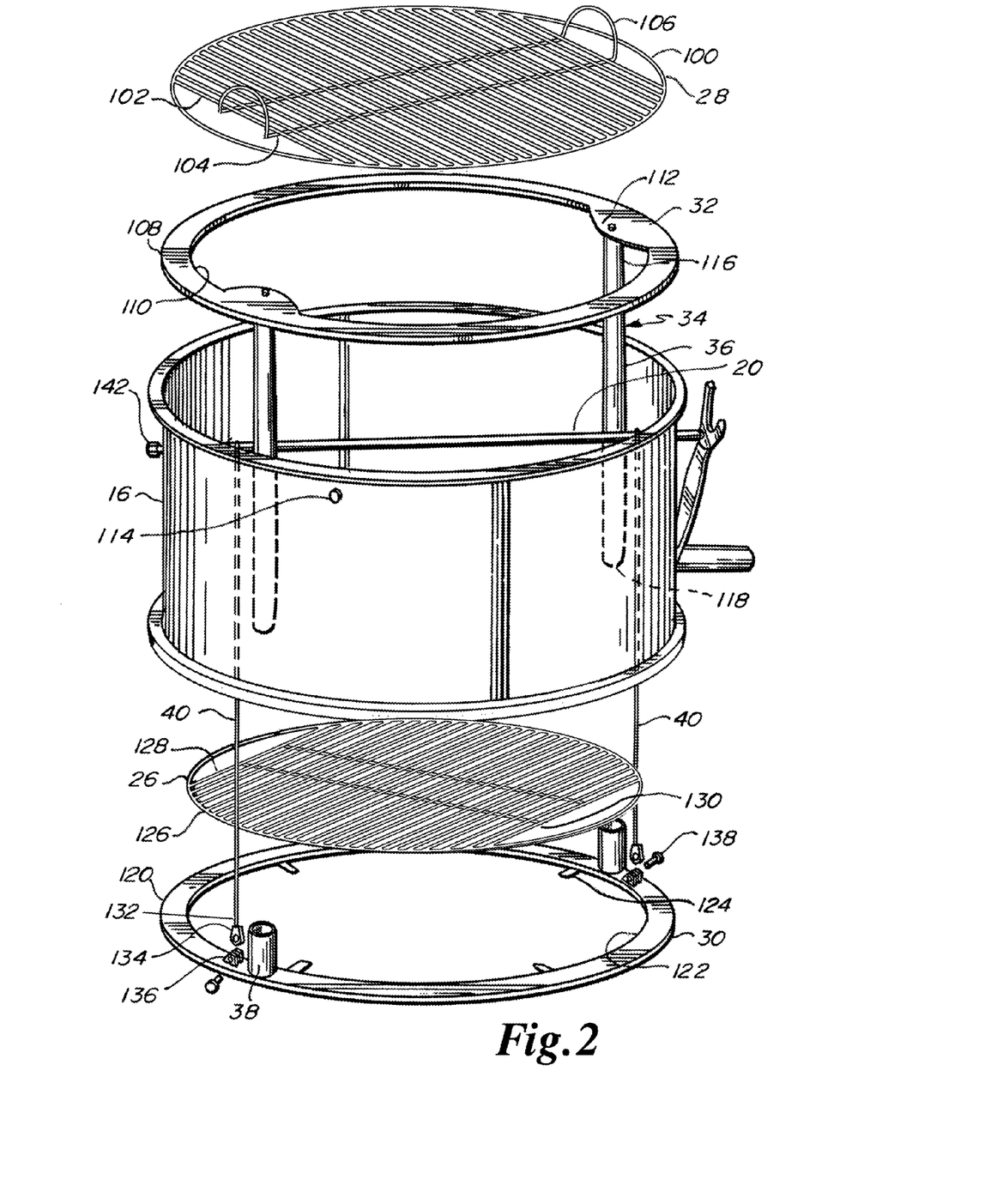
FIG. 2 is a perspective, exploded view of a portion of the grill apparatus of FIG. 1.
Figure 3A:
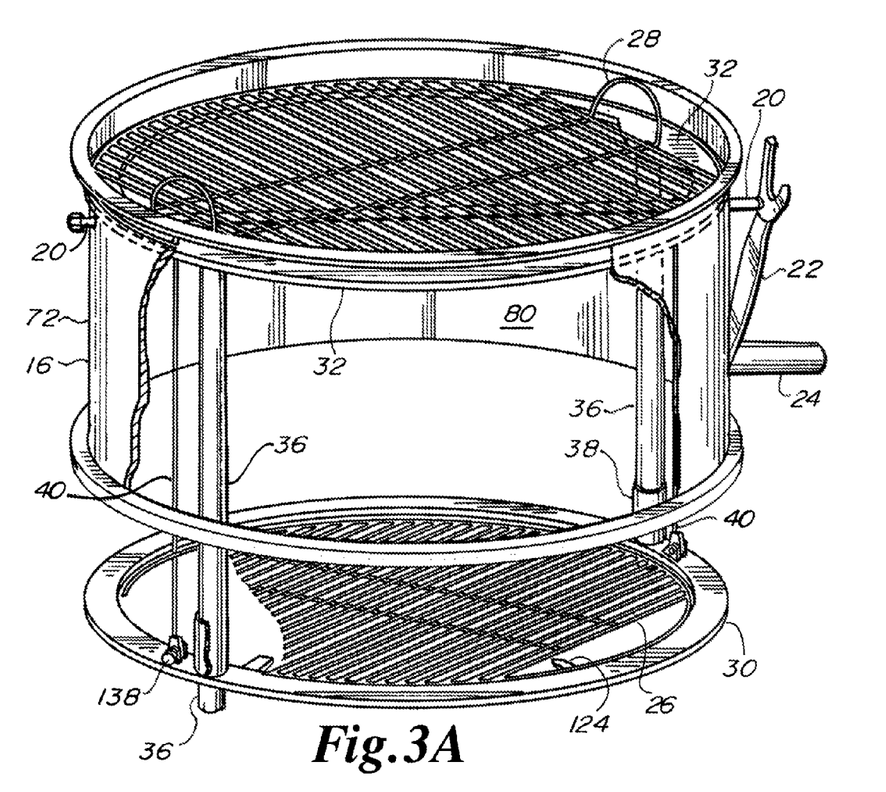
FIG. 3A is an assembled view of the portion of the grill apparatus of FIG. 2.
Figure 3B:
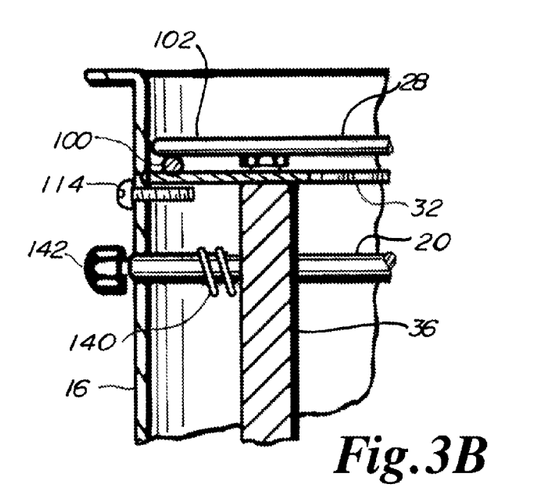
FIG. 3B is a section, cut away view, side view of a section of the portion of the grill apparatus of FIG. 3A.
Figure 4A:
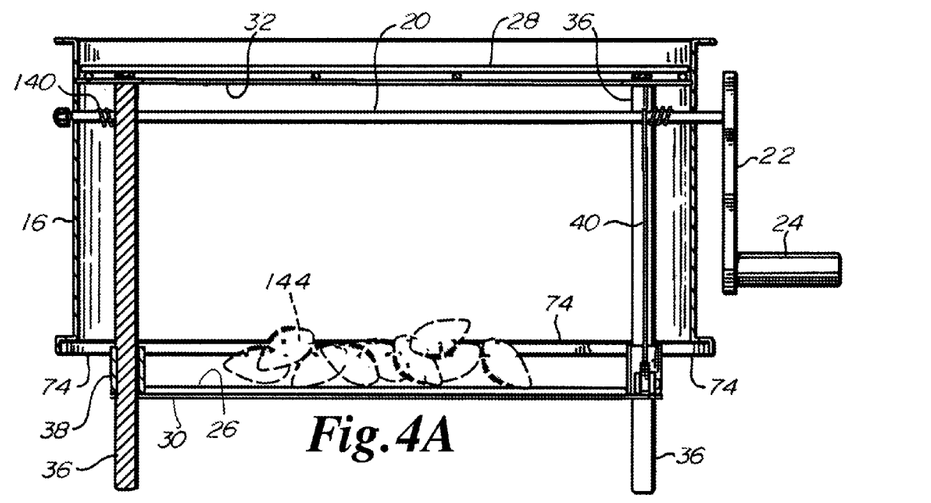
FIG. 4A is a side, section view of the portion of the grill apparatus of FIG. 2 showing the coal grate in a lowered position.
Figure 4B:
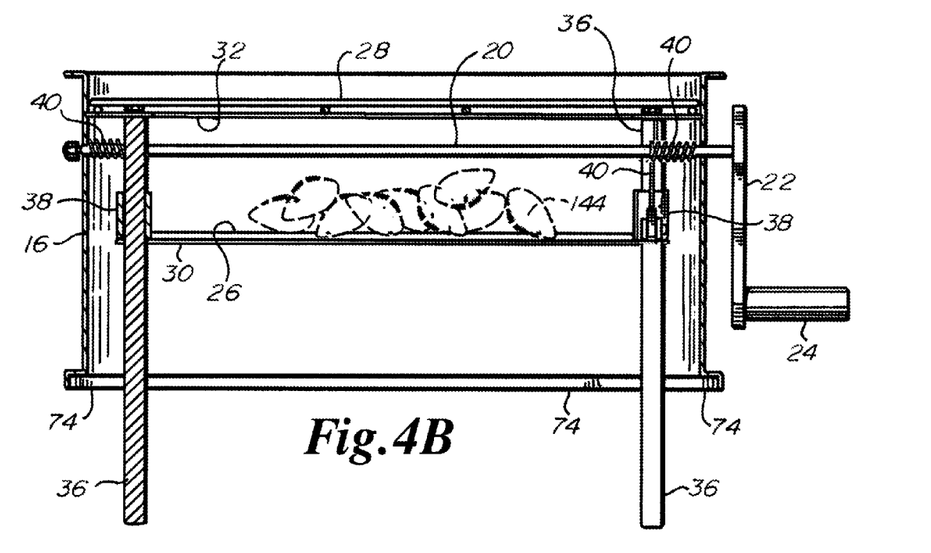
FIG. 4B is a side, section view of the grill apparatus of FIG. 2 showing the coal grate in a raised position.

As shown in FIG. 2, grill apparatus 10 further includes a coal grate 26, a food grill 28, an annular base for the coal grate 26, an annular base 32 for the food grill 28, a male/female guide arrangement 34 having guide posts 36 depending from annular base 32 and further having guide tubes 38 on annular base 30 and aligned with openings in annular base 30, and a pair of flexible tethers or flexible metal wires 40 between the rotatable shaft 20 and the annular base 30 for the coal grate 26. By cranking the handle 24 to rotate the rotatable shaft 20, tethers 40 are spooled onto and spooled off the rotatable shaft 20 to raise and lower coal grate 26 relative to the food grill 28.

More specifically, as shown in FIG. 1, the grill apparatus 10 includes a set of three legs 42. At their proximal or upper ends, each of the three legs 42 is engaged to the bottom oven portion 14. Two of the legs 42 include a wheel 44 rotatably joined at a lower or distal leg end. One of the legs 42 is free of a wheel 44 and includes a free blunt rounded distal end 46 for resting on a surface to minimize a freewheeling of the grill apparatus 10. The free end 46 is raised before the grill apparatus 10 can be freely and easily wheeled from location to location. A bracing framework 47 having a triangular perimeter extends among the three legs 42. A bowl shaped ash collector 48 is engaged to each of the three legs 42 and collects ash falling or being pushed out of openings in the bottom oven portion 14.

As further shown in FIG. 1, the grill apparatus 10 includes a handle 50 mounted on a top portion or apex portion of the top oven portion 18. By grasping handle 50 and lifting, the top oven portion 18 is lifted off the middle oven portion 16. The top oven portion 18 further includes a vent cover 52 spaced from the apex portion of the top oven portion or lid 18. The vent cover 52 pivots on a pin 54 that permits openings 56 in the vent cover 52 to align with vent through openings in the top oven portion 18 to vent the oven 12. Openings 56 may or may not align fully with vent openings in the top oven portion 18. Vent cover 52 may be rotated to create relatively small vent openings, or relatively large vent openings, or openings of a size between such relatively small and relatively large vent openings, or relatively large vent openings that are completely exposed, or closed openings where the openings 56 are closed by solid surface sections of the top oven portion 18. A tab 58 integral with the vent cover 52 and set at a bent angle thereto makes the vent cover easy to rotate.

Figure 5:
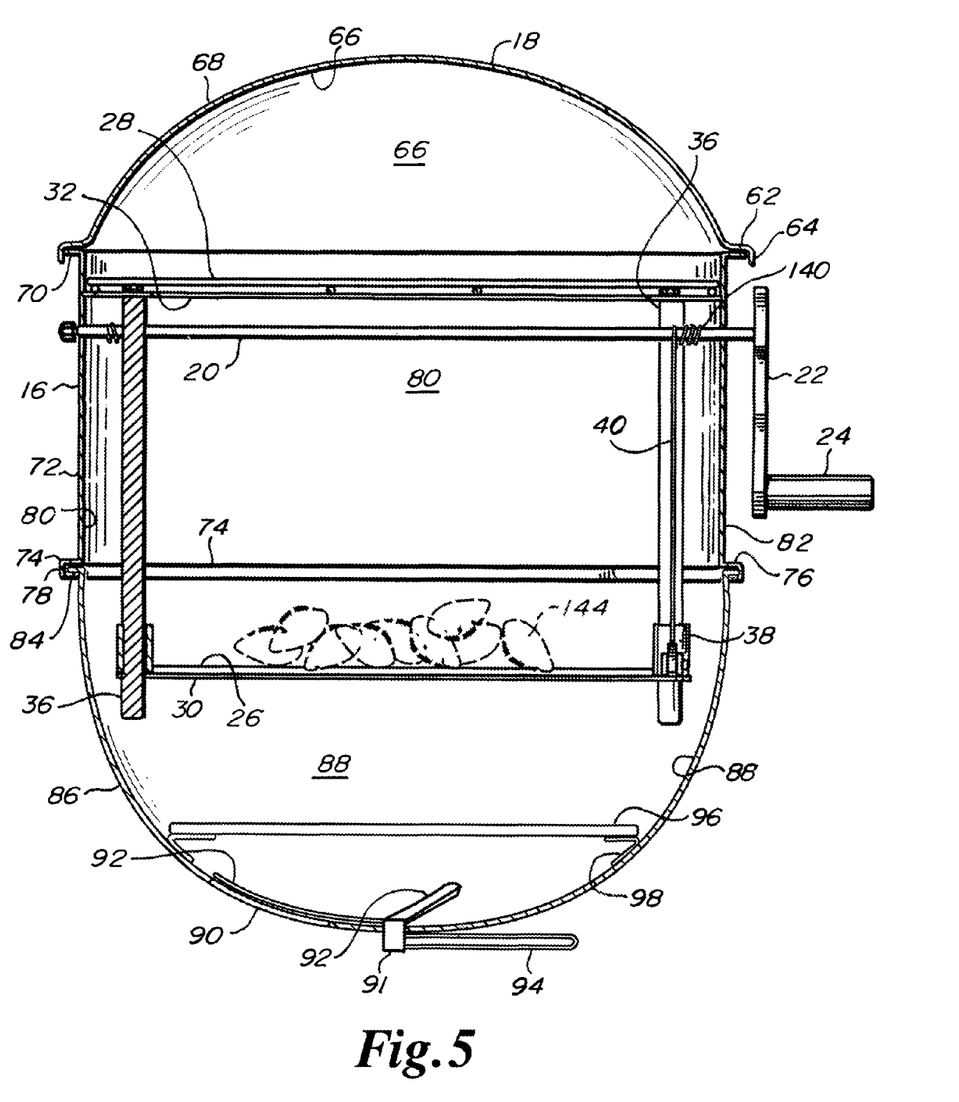
FIG. 5 is a side, section view of the grill apparatus of FIG. 1.

The top oven portion or lid 18 includes an integral flange 60 extending about the entire periphery of the bowl shaped top oven portion 18. As shown in FIG. 5, flange 60 includes an annular horizontally extending flat section 62 and an annular vertically extending section 64.

Top oven portion or lid 18, like middle oven portion 16 and bottom oven portion 14, is formed of metal.

Top oven portion or lid 18, or the body of top oven portion 18, is formed in a bowl shape. When on middle oven portion 16, top oven portion 18 is an inverted or upside down bowl. Top oven portion 18 can also be described as a receptacle or as being receptacle shaped. An inner surface 66 of top oven portion 18 is concave. Outer surface 68 of top oven portion 18 is convex. Top oven portion 18 can be described as, or can be described as being formed from, a sheet or a sheet of metal. The distance between inner surface 66 and outer surface 68, or width of such sheet, is relatively small.

Middle oven portion 16 includes an integral top outwardly turned lip 70. A first inner portion of lip 70 extends at a right angle relative to a main body 72 of the middle oven portion 16. A subsequent second portion of lip 70 is curled back toward the main body 72. Flange 60 of top oven portion 18 engages lip 70. The horizontal flange section 62 rests upon lip 70 and the vertical flange section 64 runs adjacent to and outwardly of lip 70 to limit crosswise or transverse movement of the top oven portion 18 relative to the middle oven portion 16.

Top oven portion 18 includes an open bottom end defined by flange 60.

Top oven portion 18 can be lifted off middle oven portion 16. When top oven portion 18 is on middle oven portion 16, side-to-side movement of the top oven portion 18 relative to the middle oven portion 16 is minimized by flange 60 of top oven portion 18 and lip 70 of middle oven portion 16.

Flange 60 and lip 70 form a seal to the oven 12. Gas, such as hot gas from coal on coal grate 26, may be contained in the oven 12 by such seal. Gas, such as hot gas from coal on coal grate 26, may be released from the oven 12 through such seal.

Main body 72 extends downwardly vertically and cylindrically from lip 70 to an integral bottom flange 74. Flange 74 includes a horizontal flange section 76 and a vertical flange section 78.

Middle oven portion 16, and specifically main body 72, is formed in the shape of a cylinder. Middle oven portion 16 includes an open top end that leads into top oven portion 18 and an open bottom end that leads into bottom oven portion 14. An inner surface 80 of main body 72 is cylindrical. An outer surface 82 of main body 72 is cylindrical. Middle oven portion 16 can be described as, or can be described as being formed from, a sheet or a sheet of metal. The distance between inner surface 80 and outer surface 82, or width of such sheet, is relatively small.

Bottom oven portion 14 includes an integral top outwardly turned and curled lip 84. Lip 84 curls back toward an outer convex surface 86 of the bottom oven portion 14. Lip 84 is spherical in a vertical cross section that lies in a plane extending radially from an vertical axis of oven 12. Lip 84 extends annularly about the entire upper and open end of the bottom oven portion 14. Flange 74 of middle oven portion 16 engages lip 84. Particularly, horizontal flange section 76 lies tangentially upon curled lip 84 and vertical flange section 78 lies adjacent to curled lip 84 to limit transverse or side-to-side movement of the middle oven portion 16 relative to the bottom oven portion 14.

Flange 74 and lip 84 form a loose seal to the oven 12. Gas, such as hot gas from coal on coal grate 26, may be contained in the oven 12 by such seal. Gas, such as hot gas from coal on coal grate 26, may be released from the oven 12 through such seal.

Bottom oven portion 14, or the body of bottom oven portion 14, is formed in a bowl shape. Bottom oven portion 14 can also be described as a receptacle or being receptacle shaped. Bottom oven portion 14 includes the outer convex surface 86 and further includes an inner concave surface 88. Bottom oven portion 14 can be described as, or can be described as being formed from, a sheet or a sheet of metal. The distance between outer surface 86 and inner surface 88, or width of such sheet, is relatively small.

Bottom oven portion 14 is vented. Bottom oven portion 14 includes a set of three radially extending vent openings 90 formed in a lower section of the bottom oven portion 14. A pivoting structure 91 rotatably joined to bottom oven portion 14 at its lowermost section includes a set of three radially extending vent coverings 92 that are centrally joined and may be rotated by a handle 94. When rotated, vent coverings 92 may completely cover or may partially cover or may completely expose the vent openings 90. Vent coverings 92 may be rotated to create relatively small vent openings 90, or relatively large vent openings 90, or openings 90 of a size between such relatively small and relatively large vent openings 90, or relatively large vent openings 90 that are completely exposed, or closed openings 90 where the openings 90 are completely closed by the solid vent coverings 92. Vent coverings 92 follow the shape of the concave inner surface 88 and lie parallel thereto.

Bottom oven portion 14 includes a secondary coal grate 96. Secondary coal grate 96 rests upon a set of four brackets 98 welded every ninety degrees about the inner concave surface 88 of the bottom oven portion 14. Coal grate 96 is disposed horizontally and is removable from the brackets 98. Coal grate 96 rests upon brackets 98 by gravity and is liftable off brackets 98. Grate 96 includes a framework of rods with openings such that coal ash can fall through grate 96 and such that hot gas or air can flow through grate 96.

As shown in FIG. 2, food grill 28 includes a circular perimeter defined by a circular rod 100. A plurality of straight side-to-side rods 102 run parallel to each other and adjacent to each other to cross from one side of the circular rod 100 to the other side of the circular rod 100 to which the side-to-side rods 102 are engaged, such as by welding. The plurality of straight side-to-side rigid rods 102 are supported by and engaged to, such as by welding, a pair of straight transverse rigid rods 104 running at a right angle to the straight side-to-side rods 102. If desired, food grill 28 may include just a single straight transverse rod 104. Food grill 28 further includes a pair of handles 106. Each of the handles 106 is formed of a rigid rod that has been formed into a curved shape. Handles 106 may be welded to or lead integrally from transverse rods 104. Besides consisting of a curved rod portion, handle 106 may include a straight rod portion that is welded to one or more of the rods 100, 102, 104. Handles 106 may be welded to straight side-to-side rods 102. Handles 106 are engaged to food grill 28 diametrically opposite each other. Handles 106 project upwardly and out of a plane defined by rods 100, 102, and 104. Rods 100, 102, 104 form spaces in the food grill 28 to permit fat, water and other liquids to fall off food grill 28 instead of collecting on food grill 28 and to permit hot gases and air to flow through the grill 28. Except for handles 106, food grill 28 is essentially flat. Rods 100, 102, 104 essentially lie in a plane. Food grill 28 is essentially rigid. Food grill 28 is formed of a metal and rods 100, 102, 104 and handles 106 are formed of a metal. The outside diameter of the food grill 28 is defined by the outside diameter of the circular rod 100 and this outside diameter is equal to or slightly less than the inside diameter of the main body 72 of the middle oven portion 16 and is equal to or slightly less than the diameter of the inner surface 80 of the middle oven portion 16. The food grill 28 can slide up and down in the middle oven portion 16 when the food grill 28 is disposed in a horizontal plane.

Food grill 28 lies on annular base 32. Annular base 32 is formed from a flat metal stock or from a metal plate and lies in and defines a plane. Annular base 32 is formed in a band shape with the band being disposed in a plane. Annular base 32 includes an outside perimeter 108 that defines a circle. Annular base 32 includes an inside perimeter 110. Annular base 32 includes a pair of diametrically opposite inwardly running extensions 110 that also lie in the plane of the annular base 32. Inside perimeter 110 is circular except for where the extensions 112 protrude inwardly, where the inside perimeter 110 curves in the opposite direction. The diameter of the outside perimeter 108 of the annular base 32 is about equal to or slightly less than the inside diameter of the main body 72 of the middle oven portion 16 so as to be about equal to or slightly less than the diameter of the inner surface 80. Annular base 32 can slide up and down in the middle oven portion 16 when disposed in a horizontal plane.

Annular base 32 is disposed at a set elevation in the middle oven portion 16 by a set of four pins 114 set at ninety degrees relative to each other. Each of the pins 114 has a head and a shaft, with the head being disposed outside of the middle oven portion 16 and the shaft extending into the middle oven portion 16. The shaft may be threaded and held against shifting or sliding radially in and out by a nut where the nut threads onto the shaft and the main body 72 is sandwiched between the nut and the head of the pin 114.

Annular base 32 serves as a platform for the food grill 28. The perimeter or circular rod 100 lies on the annular base 32. Side-to-side rods 102 may be welded to the top of the circular rod 100 and thus be slightly spaced from the annular base 32. The relatively large opening of the annular base 32 that is defined by the inside perimeter 110 permits food to be cooked on the food grill 28 without the annular base 32 interfering with heat from coal on the coal grate 26 and without the annular base 32 interfering with grease, oil, fat and other liquids dripping from food on the food grill 28.

The elevation or position or height at which the annular base 32 is fixed is adjacent to or confronts the upper end of the middle oven portion 16 or the lip 70 of the middle oven portion. The annular base 32 is recessed into the middle oven portion 16 at a depth sufficient to permit an upper portion of the main body 72 to act as a circular wall to retain food on the food grill 28. This depth may be one or two or three inches as measured from the lip 70.

Guide posts 36 depend vertically from the extensions 112. Each of the guide posts 36 is straight and includes an upper end 116 and a lower end 118. The upper end 116 is engaged to a respective extension 112 by a pin. Each of the upper and lower ends 116, 118 is flat. The lower end 118 may be rounded, spherical, or tapered if desired such that the lower end 118 may be more easily insertable into the guide tube 38 on the annular base 30 that holds the coal grate 26. The guide posts 36 are diametrically opposite of each other. The guide posts 36 run vertically and parallel to the main body 72 of the middle oven portion 16.

The male/female arrangement 34, that includes the guide tubes 38 sliding up and down the guide posts 36, maintains the annular bases 30, 32 coaxial with each other. The male/female arrangement 34 keeps the lower coal grate annular base 30 from spinning on a vertical axis. The male/female arrangement 34 minimizes any tipping of the lower coal grate annular base 30. The male/female arrangement 34 keeps the lower coal grate annular base 30 generally horizontal and at a right angle to the main body 72 of the middle oven portion 16.

The guide posts 36 extend through the bottom opening of the middle oven portion 16 and into and through the upper opening of the bottom oven portion 14. As shown in FIG. 5, the bottom ends 118 of the guide posts 36 are adjacent to the inwardly curving concave surface 88. The guide posts 36 extend sufficiently far into the bottom oven portion 14 such that the coal grate 26, which is disposed above the bottom ends 118 of the guide posts 36, can also be disposed in the bottom oven portion 14. The guide posts 36 extend sufficiently far vertically and downwardly so as to cut through a plane defined by a junction between the bottom oven portion 14 and the middle oven portion 16 and such that the coal grate 26 lies below such a plane. Each of the guide posts 36 is the same length as the other guide post 36. The lower ends 118 of the guide posts 36 may terminate adjacent to the secondary coal grate 96.

Guide tubes 38 receive the guide posts 36. Guide tubes 38 are mounted, such as by welding, on annular base 30. Guide tubes 38 are disposed on the annular base 30 diametrically opposite of each other. The inside diameter of each of the guide tubes 38 is about equal to or slightly greater than the outside diameter of each of the guide posts 36 such that the guide tubes 38 slide easily up and down the guide posts 36 but with minimal transverse or side-to-side movement or wobble. The height or vertical length of the guide tubes 38 are sufficient such that the annular base 30 and coal grate 26 are maintained horizontally with minimal or no wobble as the annular base 30 and coal grate 26 are drawn up and let down by the tethers or cables or wires 40. Each of the guide tubes 38 is aligned with an opening formed in annular base 30 and such openings have a diameter about equal to or greater than the inside diameter of the guide tubes 38 such that the guide posts 36 can also slide easily relative to such openings. The outside diameter of each of the guide tubes 38 is slightly less than or equal to a width of the annular base 30 such that the guide tubes 38 do not protrude into space used for and by the coal grate 26. Like guide posts 36, guide tubes 38 are formed of metal.

The annular base 30 is formed from a flat metal stock or from a metal plate and lies in and defines a plane. Annular base 30 is formed in a band shape with the band being disposed in a plane. Annular base 30 includes an outside perimeter 120 that defines a circle. Annular base 30 includes an inside perimeter 122 that defines a circle. Annular base 30 includes a set of four inwardly running, horizontal, and radially oriented pins 124 that are welded to the underside of the main plate of the annular base 30. Pins 124 are set at ninety degrees relative to each other and function to support the coal grate 26.

The diameter of the outside perimeter 120 of the annular base 30 is less than the inside diameter of the main body 72 of the middle oven portion 16 but still is adjacent to or confronts the inside surface 80 of the main body 72 when the annular base 30 is in the middle oven portion 16.

Annular base 30 and specifically the set of four pins 124 serve as a platform for the coal grate 26. The inside perimeter 122 of the annular base 30 has a diameter about equal to or slightly greater than an outside diameter of the coal grate 26 such that the coal grate 26 is retained on the pins 124 with minimal or no side-to-side or transverse movement.

The coal grate 26 includes a perimeter or circular rod 126. The perimeter or circular rod 126 lies on the set of four pins 124. Side-to-side rods 128 may be welded to the top of the circular rod 126. A pair of supporting transverse rods 130 underlie, support and engage, such as by welding, the side-to-side rods 128. The relatively large opening of the annular base 30 that is defined by the inside perimeter 122 permits a relatively large coal grate 26 and a relatively large amount of coal to be placed on the coal grate 26. Coal grate rods 126, 128 and 130 create spaces in the coal grate 26 to permit ash to fall therethrough and to permit hot gases and air to circulate through the coal grate 26 and throughout the oven 12. Coal grate 26 lies substantially in a plane. Coal grate 26 is removable from annular base 30 by lifting up on the coal grate 26.

Each of the tethers or cables or wires 40 includes a distal end 132 engaged to an eyelet or shackle 134. Eyelet 134 is engaged between two brackets 136, where each of the brackets 136 includes an aperture for receiving a pin 138. Brackets 136 are mounted, such as by welding, to annular base 30. Alternatively, brackets 136 may be integral with a metal base or bar, and such metal base or bar may be pinned to the annular base 30. Pin 138 extends through the aperture of one bracket 136, then extends through eyelet 134, and then extends through the aperture of the other bracket 136. Pin 138 may be threadingly engaged to the brackets 136. Pin 138 is removable from the brackets 136 such that tethers 40 are removable from the annular base 30. Brackets 136 are set on the annular base 30 diametrically opposite of each other. Brackets 136 are adjacent to guide tubes 38 such that an upward pulling force on the annular base 30 is a vertical force adjacent to and generally parallel to the coaxial arrangement between the guide tubes 38 and guide posts 36 to minimize friction therebetween or to minimize an offset arrangement between the guide tubes 38 and guide posts 36 that may lead to friction.

Each of the tethers or cables or wires 40 includes an upper or proximal end portion 140. Upper end portion 140 may be fixed to rotatable shaft 20 by being pinched between a ring and the rotatable shaft 20, where such ring is nonrotatably fixed to the rotatable shaft 20 by a set screw. Thus, when the rotatable shaft 20 is rotated, such ring is also rotated, thus taking up or spooling up the tether 40. Such ring and the upper, proximal end 140 of the tether 40 is preferably fixed adjacent to the inner cylindrical surface 80 of the middle oven portion 16 such that each of the tethers 40 extends downwardly and somewhat inwardly from the rotatable shaft 20 to the annular base 30.

Instead of a ring and set screw, the upper ends of the tethers or cables or wires may be wedged into an angled slit or slot formed in the rotatable shaft 20.

The rotatable shaft 20 has two outer ends. These outer ends are disposed outside of the oven 12. An interior portion of the rotatable shaft 20 is in the oven 12, namely, in the middle oven portion 16. Preferably the two upper ends of the tethers 40 are joined to the rotatable shaft 20 close to the inner surface 80 of the middle oven portion. Then, when the tethers 40 are spooled so as to draw the coal grate 26 upwardly, the tethers 40 spool inwardly and axially along the rotatable shaft 20. Then, when the coal grate 26 is let down, the tethers spool outwardly and axially along the rotatable shaft 20.

Each of the tethers 40 spools in a spiral manner along the rotatable shaft 20.

Tether or cable 40 is a flexible metal wire. Tether 40 is sufficiently strong to carry annular base 30, coal grate 26, and a relatively large amount of fuel such as coal. Eyelet 132, and thus the distal end 132 of tether 40 is pivotable relative to annular base 30 since the upper tether end 140 is not static but spools axially inwardly from an outer portion of the rotatable shaft 20. Opposing pins 138 are diametrically opposite of each other and extend radially relative to annular base 30. Pins 138 define an axis and such axis is generally parallel to the axis of the rotatable shaft 20. Eyelets 132 pivot on this axis and pivot back and forth when the upper tether end 140 is spooled on and off rotatable shaft 20.

Rotatable shaft 20 may have a relatively small diameter where the coal grate 26 is raised in relatively small increments. Rotatable shaft 20 may have a relatively great diameter where the coal grate 26 is raised in relatively large increments. Where rotatable shaft 20 has a relatively small diameter, each of the tethers 40 may be wrapped about the rotatable shaft 20 a relatively great number of times to raise the coal grate 26 to a certain height. Where rotatable shaft 20 has a relatively great diameter, each of the tethers 40 may be wrapped about the rotatable shaft 20 a relatively few number of times to raise the coal grate 26 to such certain height.

The length of each of the tethers 40 is, when the tethers 40 are fully extended, such so as to keep the distal ends 118 of the guide posts 36 below the bottom ends of the guide tubes 38 and below the annular base 30 so as to maintain the coal grate 26 and its load of coal in a horizontal position. The tethers 40 raise the annular base 30 relative to the annular base 32 until the upper end of the guide tubes 38 make contact with the underside of the annular base 32.

Rotatable shaft 20 extends diametrically through the middle oven portion 16. A distal end of rotatable shaft 20 is outside of oven 12 and includes a nut 142 threaded thereon. A proximal end of rotatable shaft 20 extends outside of oven 12 and engages the relatively heavy piece 22, which includes the handle 24. The rotatable shaft 20 includes stops that are fixed just inwardly of the inner surface 80 of the middle oven portion 16 to limit axial sliding of the rotatable shaft 20. These stops may be the rings that fix the upper tether ends 140 to the rotatable shaft 20.

Relatively heavy piece 22 may be welded to rotatable shaft 20 or may be fixed thereto with a pair of threaded nuts, with the nuts threaded onto the rotatable shaft 20 and pinching one end of the relatively heavy piece 22 therebetween. The other end of the relatively heavy piece 22 includes the handle 24. The handle 24 is rotatably fixed to the relatively heavy piece 22 such that, when the handle 24 and relatively heavy piece 22 are cranked in unison, the handle 24 rotates relative to the relatively heavy piece 22.

The relatively heavy piece 22 includes sufficient weight, or mass, to more than counterbalance the coal grate 26 having a load of coal thereon. In other words, the coal grate 26 having a large load of coal does not automatically unspool the tethers 40 from the rotatable shaft 20. In still other words, the relatively heavy piece 22 and handle 24 include such sufficient mass to rotate automatically, when manually released, to a position where the relatively heavy piece 22 is vertical and the handle 24 is below the rotatable shaft 20. This difference between 1) the mass of the relatively heavy piece 22 and handle 24 (as one unit) and 2) the coal grate 26 having a large load of coal thereon functions as a lock to a raising and lowering of the coal grate 26.

The present grill apparatus 10 includes a hoist or winch. This hoist or winch includes one or more of rotatable shaft 20, tethers 40, relatively heavy piece 22, and handle 24. A hoist or winch is a device for lifting or lowering a load utilizing a circular object such as a rod, shaft, drum or lift-wheel about which or around which wraps a flexible element such as a cable, fiber, rope or chain. The hoist or winch may be manually operated or electrically or pneumatically driven. Here the present hoist or winch is manually operated by the relatively heavy piece 22 and handle 24.

In operation, to place coal on the coal grate 26, top oven portion 18 is lifted off the middle oven portion 16 and set aside. Then the handle 24 is cranked to raise the coal grate 26 as high as the user wishes to raise the coal grate 26, such as to a position where the coal grate 26 is adjacent to the upper opening of the middle oven portion 16 and where the upper ends of the guide tubes 38 hit the underside of the annular base 32 to stop the raising of the coal grate 26. Then food grill 28 is lifted off annular base 32. Then coal is loaded on relatively high coal grate 26. Then the coal is lit. Then the handle 24 is cranked to lower the coal grate 26 to a desired level. Then the top oven portion 18 may be placed upon the middle oven portion 16.

Then the coal is permitted to burn for the desired amount of time. At some point in time, the top oven portion 18 is lifted off the middle oven portion 16 to expose the food grill 28. Then food may be placed on the food grill. If desired at this time, the coal grate 26 may be raised to a desired level. Then, if desired, the top oven portion 18 is placed back on the middle oven portion.

The top oven portion 18 may be lifted off the middle oven portion 16 from time to time to check on the food being grilled. One hand may hold the top oven portion 18 and the other hand may crank the handle 24 to raise or lower the coal grate 26. Then the top oven portion 18 may (or may not be) placed back upon the middle oven portion 16.

Food can be cooked on the food grill 28 without the top oven portion 18 on the middle oven portion 16. The above steps can be performed without the top oven portion 18 on the middle oven portion 16.

During cooking, prior to cooking, or after cooking, the coal grate 26 stays at one elevation. In other words, unless the handle 24 is cranked, coal grate 26 does not move up or down. Piece 22 and handle 24 are of a sufficient weight or mass to counterbalance the coal grate 26. For example, if the piece 22 is disposed horizontally, piece 22 will rotate until the piece 22 is vertical with the handle 24 finding a lowermost position. In still other words, rotatable shaft 20 when viewed from an end forms the center of a circle. Piece 22 projects radially out from the center of such circle. Handle 24 when rotated defines the perimeter of such circle. If this circle defines a conventional clock, the handle 24 will return, from any position other than the six o'clock position, under the influence of gravity to the six o'clock position or to the "down" position. When the handle 24 moves automatically, the coal grate 26 will be raised or lowered.

With the present grill apparatus 10, searing food, such as meat, poultry or fish, is easy. Instead of moving coal side-to-side or moving the food side-to-side in and out of relatively high heat, food may be seared by raising the coal grate 26 upwardly close to the food grill 28. Then, after searing, the coal grate 26 is lowered to the desired level to cook the food under a lower heat, unless the searing step was done at the end of the cooking process. Searing creates desirable flavors through caramelization and the Maillard reaction. Searing may improve the appearance of food by placing a brown crust upon it. Searing may, desirably, create a contrast in taste and texture between the inside and outside of the meat, poultry or fish. The entire food grill 28 may be used for searing; empty space on the food grill 28, to which seared food is conventionally moved, need not be preserved; two zones for grilling, one at a searing temperature, one at a lesser temperature, need not be created. Likewise, the entire coal grate 26 may be filled with charcoal or coal; two zones here on the coal grate 26, one with hot coal, one at a lesser temperature or having no heat source, need not be created.

The rotatable shaft 20 enters the middle oven portion 16 at two locations. These locations are substantially sealed, such as against flow of air inside or out of the middle oven portion 16 or flow of hot gases from the inside of the middle oven portion 16 to the outside of the middle oven portion 16. Further, with such locations sealed, venting at and between bottom and top portions of the grill apparatus 10 is more controllable, where venting at a bottom portion of the grill apparatus 10 is provided by vent covers 92 and vent openings 90, and where venting at a top portion of the grill apparatus 10 is provided by vent cover 52 and vent holes 56. If desired, such venting can substantially close the interior of the oven 12 off to outside air.

With the present grill apparatus 10, the movement of food is minimized. Food is not moved, or is moved less, from one portion of the food grill 28 to the next. When food movement is minimized, moisture and juices are better retained in the food.

With the present grill apparatus 10, and with the raising and lowering of the coal grate 26, the speed or slowness of how fast a food is being cooked is easily controlled and requires a minimum of effort such that a cook can pay greater attention to other aspects of cooking.

If desired, the annular base 30 that mounts the coal grate 26 may have a perimeter wall, perhaps an inch or two high, to retain coal on the coal grate 26. Such perimeter wall may be outwardly flared or outwardly angled. Such a perimeter wall or retainer may help the coal grate 26 to hold more charcoal.

It can be appreciated that coal or charcoal may rest upon the annular base 30 as well as the coal grate 26.

It should be noted that the annular base 30 may have a diameter that is very close to the inner diameter of the middle oven portion 16 and that the inner surface 80 of the main body 72 of the middle oven portion 16 may act as a retainer to keep coal or charcoal in place.

A tether, such as tether 40, may be a cable, wire, or chain. A tether is an elongate, narrow, flexible element. Used in the grill apparatus 10, the tether is an elongate flexible element whose integrity stays intact under high heat, such as heat in a range from room temperature to about 475° F.

It should be noted that handle 24 can be cranked either way to raise the coal grate 26 from a bottommost position where the coal grate 26 is in the bottom oven portion 14. That is, when tether 40 has been spooled all of the way out, the coal grate 26 sits at the bottommost position. This is effectively the lower stop for the coal grate 26. When the tether 40 has been spooled all of the way out, the tether 40 depends immediately from the rotatable shaft 20 without any wrapping about or spooling about the rotatable shaft 20. Thus, to spool up the tether 40, it does not matter whether the handle 24 is cranked clockwise or counter-clockwise. Thus, when the coal grate 26 is lowered from an uppermost position, to a lowermost or bottommost position, and back to an uppermost position, the handle 24 can be continuously turned clockwise or counter-clockwise.

The present grill apparatus 10 includes a train between the handle 24 and the coal grate 26. This train includes one or more of the handle 24, the relatively heavy piece 22, the rotatable shaft 20, the tethers 40, the annular grill 30, and the coal grate 26.

One form that the invention may take is the combination of 1) the middle oven portion 16, 2) the rotatable shaft 20 including the tethers 40 and eyelets 134, 3) the piece 22 including the handle 24, 4) the annular base 32 including the guide posts 36, 5) the annular base 30 (with or without a retainer such as a flared retainer) including the guide tubes 38 and brackets 136, and 6) optionally, one or more of the coal grate 26 and food grill 28. Such then may be combined by a user with 1) the bottom oven portion 14, 2) top oven portion 18, and 3) optionally, one or more of the coal grate 26 and food grill 28.

The top oven portion 18, or lid 18, is removable from the middle oven portion 16 without damaging the integrity of either piece. The middle oven portion 16 is removable from the bottom oven portion 14 without damaging the integrity of either piece. The grate 26 and grill 28 are removable from the oven 12 without damaging the integrity of either piece or the oven 12. First and second annular bases 30, 32 are removable from the oven 12 and from their respective grate and grill 26, 28 without damaging the integrity of the oven 12 or any of such pieces. The grate 26 is removable from the tethers 40 that raise and lower the grate 26 without damaging the integrity of any of such pieces. The first and second guide posts 36 are removable from their respective first and second guide tubes 38 such that the first and second annular bases 30, 32 are removable from each other without damaging the integrity of any of the annular bases 30, 32. The rotatable shaft 20 is removable from the middle oven portion 16 without damaging the integrity of either piece. The tethers 40 are removable from the rotatable shaft 20 without damaging the integrity of any of such pieces. In other words, top oven portion 18 is one-piece, middle oven portion 16 is one-piece, bottom oven portion 14 is one-piece, grate 26 is one-piece, grill 28 is one-piece, annular base 30 is one-piece with tubes 38, annular base 32 is one-piece with guide posts 36, the rotatable shaft 20 is one-piece, and each of the tethers 40 are one-piece.

A set of blocks 144 of flammable matter is shown in FIG. 5 resting on coal grate 26. Block 144 is used as a fuel source to start and maintain a fire. Flammable matter block 144 can be a briquette such as a charcoal briquette, a biomass briquette, a paper briquette, a straw briquette, a hay briquette, or a peat briquette. Block 144 can include one or more of wood charcoal, mineral char, mineral carbon, limestone, starch, borax, sodium nitrate, sawdust, wax and chaff such as a rice chaff or peanut chaff. Block 144 can include one or more of a fuel, ash colorant, binder, release agent, accelerant, binder, and ignition facilitator.

The food grill 28 may be or include a gridiron or grid. A grid may be defined as a framework of spaced bars that are parallel to or cross each other.

In perhaps its conventional meaning, a grate is a metal frame with bars across it that is used to cover an opening. The present coal grate 26 herein includes, in its definition, racks, grills, gridirons and grids.

The present food grill 28 and coal grate 26 are frameworks of spaced bars. Grate 26 and grill 28 need not include bars that are parallel to each other. Grate 26 and grill 28 need not include bars that cross each other.

Figure 6:
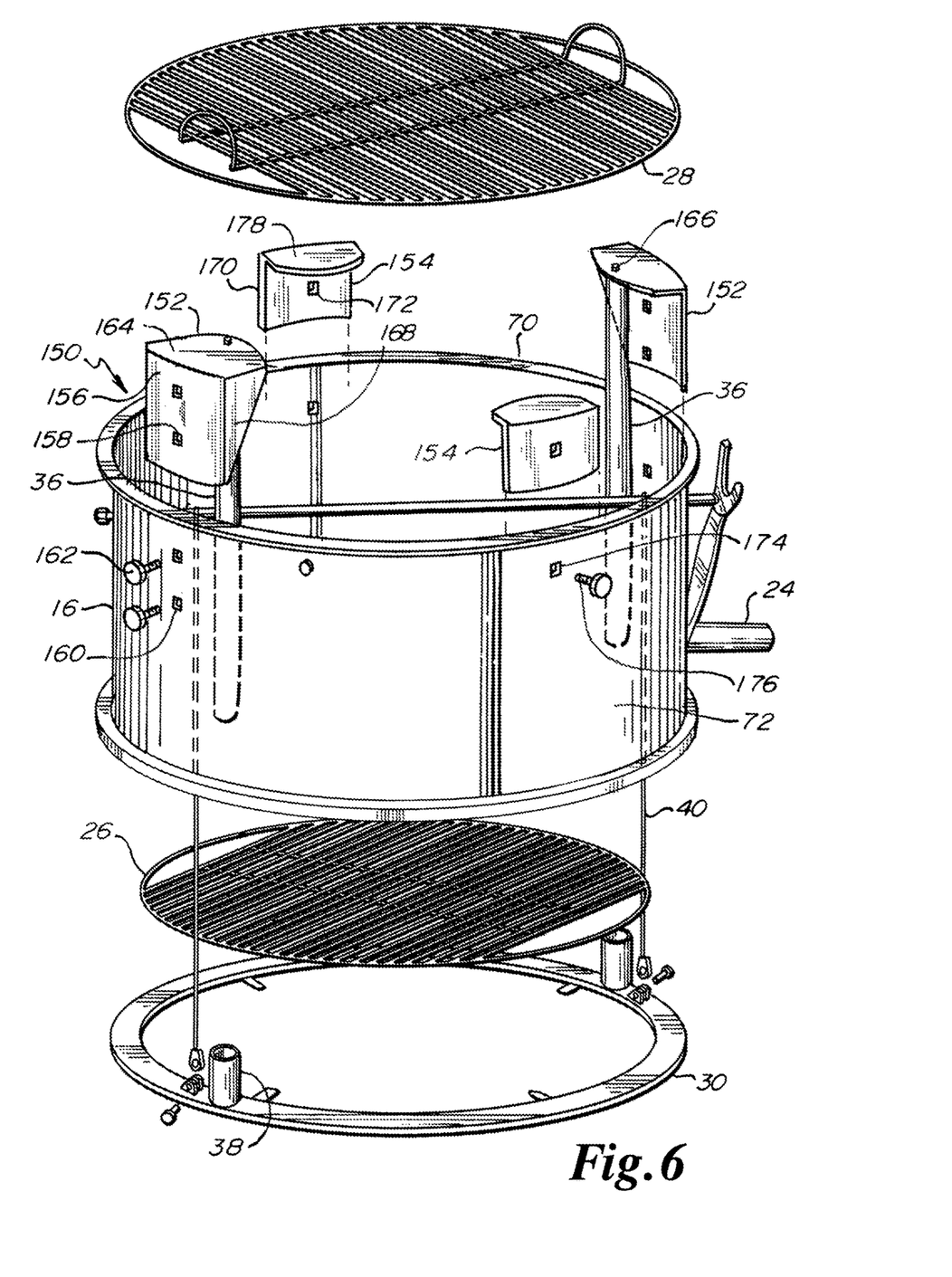
FIG. 6 is a perspective, exploded view of a portion of an alternate embodiment of the grill apparatus of FIG. 1.

FIG. 6 shows an alternate embodiment of the grill apparatus 10. The alternate embodiment is designated by the reference number 150. Grill apparatus 150 includes the same parts and features of grill apparatus 10 except that the grill apparatus 150 does not include the annular base 32 for the food grill 28 and instead includes a set of brackets for mounting the guide tubes 36 and holding the food grill 28. These brackets include a pair of brackets 152 for both mounting the guide tubes 36 and holding the food grill 28 and a pair of brackets that only serve to hold the food grill 28.

Bracket 152 includes a curved back plate section 156 that abuts the inner surface 80 of the middle oven portion 16. Curved back plate section 156 includes a pair of through openings 158 that align with a pair of through openings 160 formed in the cylindrical main body 72 of the middle oven portion 16. Pins 162 are engaged in the openings 158, 160 to hold brackets 152 in place.

Bracket 152 further includes a top plate section 164 extending at a right angle to the back plate section 156. Top plate section 164 abuts the food grill 28 and serves a mount for the food grill 28. Top plate section 164 also serves a mount for guide post 36. A pin 166 engages the guide post 36 to the top plate section 164. Top plate section 164 protrudes from the back plate section 156 toward the center of the cylindrical main body 72.

Bracket 152 further includes a side plate section 168. Side plate section 168 is triangular and is engaged to each of the curved back plate section 156 and top plate section 164. Side plate section 168 is a brace for, and serves to support, top plate section 164. Side plate section 168 extends at a right angle to each of the back plate section 156 and the top plate section 164. Side plate section 168 does not interfere with the raising of coal grate 30 because the top of the guide tubes 38 will hit the underside of the top plate section 164 prior to the coal grate 26 or annular base 30 coming into contact with the side plate section 168.

Bracket 154 includes a curved back plate section 170 having a through opening 172. Opening 172 is aligned with opening 174 formed in the main body 72 of the middle oven portion 16. A pin 176 is engaged in the openings 172, 174 to engage the bracket 154 to the main body 72.

Bracket 154 further includes a top plate section 178. Top plate section 178 extends toward a center of the cylindrical main body 72 and is set at a right angle relative to curved back plate section 170. Top plate section 178 serves as a mount for food grill 28.

Top plate sections 178 of brackets 154 are co-planar with top plate sections 164 of brackets 152 such that the food grill 28 is maintained horizontally.

Brackets 152 are set in the middle oven portion 16 diametrically opposite of each other. Brackets 154 are set in the middle oven portion 16 diametrically opposite of each other. Each of the brackets 152 is ninety degrees from each of the brackets 154.

When the food grill 28 is on the brackets 152, 154, the food grill 28 is disposed at the level of the flange 60 or slightly below the level of the flange 60, such as at the level or altitude shown in FIG. 5 or explained above in relation to one or more of FIGS. 1, 2, 3A, 3B, 4A, 4B, and 5. At any of such altitudes, the food grill 28 is disposed above the rotatable shaft 20. Thus the top plate sections 164 and 178 are disposed at the level of the flange 70 or between the level of the flange 70 and the level of the rotatable shaft 20.

It should be noted that bracket 152 may have a second side plate section 168, where the second side plate section 168 is engaged to the bracket 152 exactly like the first side plate section 168 shown in FIG. 6, except that the second side plate section 168 opposes and mirrors the first side plate section 168, such that each of the brackets 152 includes a pair of side plate sections 168, such that each of the side plate sections 168 engages an outer side portion of curved back plate section 156 and an outer side portion of top plate section 164, and such that the side plate sections 168 run parallel to each other.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A middle oven apparatus for a grill apparatus, the grill apparatus having top and bottom oven portions, each of the top and bottom oven portions being bowl shaped, the top oven portion having a shape of an inverted bowl when on the middle oven portion, the bottom oven portion having a shape of an upright bowl when the middle oven portion is on the bottom oven portion, each of the top and bottom oven portions being concave such that said top oven portion is defined by an inner surface that is concave and an outer surface that is convex and such that said bottom oven portion is defined by an inner surface that is concave and an outer surface that is convex, each of the top and bottom oven portions being one-piece, the middle oven apparatus comprising:
  a) a middle oven portion, the middle oven portion having a cylindrical shape, the middle oven portion having a cylindrical inner surface and a cylindrical outer surface, the middle oven portion engaging the top oven portion such that the top oven portion is disposable on the middle oven portion, the middle oven portion engaging the bottom oven portion such that the middle oven portion is disposable on the bottom oven portion, the top, middle and bottom oven portions forming an oven closeable to air when the top oven portion is on the middle oven portion and when the middle oven portion is on the bottom oven portion, the middle oven portion being removable from the top and bottom oven portions without destroying the integrity of the middle oven portion, the middle oven portion being removable from the top and bottom oven portions without destroying the integrity of the top and bottom oven portions, the middle oven portion being one-piece;
  b) a grill mount, the grill mount being engaged to the middle oven portion;
  c) a grate mount, the grate mount being disposed below the grill mount;
  d) a rotatable shaft and a tether, the rotatable shaft engaged to the middle oven portion, the tether being engaged between the rotatable shaft and the grate mount, the grate mount being raised and lowered in the middle oven portion when the rotatable shaft is rotated to spool up and to spool out said tether such that the grate mount is incrementally disposable at incrementally different heights relative to the grill mount, the rotatable shaft running horizontally between the grill mount and the grate mount; and
  e) a manually crankable handle, the manually crankable handle engaged to the rotatable shaft, the manually crankable handle being outside of the middle oven portion, the tether raising and lowering the grate mount and being operated when the manually crankable handle is cranked.

2. The middle oven apparatus of claim 1, and further comprising a grill being disposed on the grill mount, the grill being removable from the middle oven portion without destroying the integrity of the middle oven portion, the grill having a grill annular perimeter that includes a grill diameter less than a diameter of the cylindrical inner surface of the middle oven portion, the grill being in the middle oven portion when on the grill mount.

3. The middle oven apparatus of claim 1, and further comprising a grate being disposed on the grate mount, the grate being removable from the middle oven portion without destroying the integrity of the middle oven portion, the grate having a grate annular perimeter that includes a grate diameter less than a diameter of the cylindrical inner surface of the middle oven portion, the grate being on the grate mount that is raiseable and lowerable.

4. The middle oven apparatus of claim 1, wherein the grate mount is raiseable and lowerable into and out of the middle oven portion.

5. The middle oven apparatus of claim 1, and further comprising a guide, the grate mount being raiseable and lowerable, the guide comprising a male and female arrangement between the middle oven portion and the grate mount, the male and female arrangement having an axis set at a right angle relative to the grate mount.

6. The middle oven apparatus of claim 1, wherein the grate mount comprises a grate annular base, the grate annular base being raiseable and lowerable into and out of the middle oven portion, the grate annular base having a grate annular perimeter that includes a grate diameter less than a diameter of the cylindrical inner surface of the middle oven portion.

7. The middle oven apparatus of claim 1, wherein the middle oven portion has a top section and a bottom section, wherein said grill mount is disposed at a first height adjacent to the top section of the middle oven portion, wherein said grate mount is disposable at a second height adjacent to the grill mount, wherein said grate mount is disposable at a third height adjacent to the bottom section of said middle oven portion, wherein said grate mount is disposable at a fourth height below the middle oven portion, wherein said first height is greater than said second height, wherein said second height is greater than said third height, wherein said third height is greater than said fourth height.

8. The middle oven apparatus of claim 1, wherein the manually crankable handle includes a counterbalance, the manually crankable handle when rotated defining a circle, the circle being in a vertical plane, the counterbalance being a lock against unspooling of said tether such that gravity does not automatically lower said grate mount.

9. The middle oven apparatus of claim 1, wherein the manually crankable handle includes a counterbalance having sufficient mass such that gravity does not automatically lower said grate mount.

10. The middle oven apparatus of claim 5, wherein the male and female arrangement comprises a male portion and a female portion, the male and female portion being slideable relative to each other.

11. The middle oven apparatus of claim 5, wherein the male and female arrangement comprises a male portion and a female portion, one of the male and female portion being engaged to the middle oven portion, the other of the male and female portion being engaged to the grate mount, the grate mount comprising a grate annular base having a grate annular perimeter that includes a grate diameter less than a diameter of the cylindrical inner surface of the middle oven portion.

12. The middle oven apparatus of claim 5, wherein the male and female arrangement comprises a male portion and a female portion, wherein one of the male and female portions comprises a tube.

13. The middle oven apparatus of claim 5, wherein the male and female arrangement comprises a male portion and a female portion, wherein one of the male and female portions comprises a post and the other of the male and female portions comprises a tube receiving the post.

14. The middle oven apparatus of claim 1, wherein a top section of said middle oven portion forms a first seal with said top oven portion, and wherein a bottom section of said middle oven portion forms a second seal with said bottom oven portion.

15. The middle oven apparatus of claim 5, wherein the male and female arrangement extends sufficiently far downwardly so as to cut through a plane defined by a junction between the middle oven portion and the bottom oven portion.

16. The middle oven apparatus of claim 5, wherein the male and female arrangement includes a portion that extends sufficiently far downwardly so as to cut through a plane defined by a junction between the middle oven portion and the bottom oven portion.

17. The middle oven apparatus of claim 1, wherein the middle oven portion includes a top section that includes an annular lip, wherein the middle oven portion includes a bottom section that includes an annular flange, said annular lip limiting side to side movement of the middle oven portion relative to the top oven portion when the middle oven portion and the top oven portion are engaged to each other, said annular flange limiting side to side movement of the middle oven portion relative to the bottom oven portion when the middle oven portion and bottom oven portion are engaged to each other.

18. A middle oven apparatus for a grill apparatus, the grill apparatus having top and bottom oven portions, each of the top and bottom oven portions being one-piece, the middle oven apparatus comprising:

a) a middle oven portion, the middle oven portion having a cylindrical shape, the middle oven portion having a cylindrical inner surface and a cylindrical outer surface, the middle oven portion engaging the top oven portion such that the top oven portion is disposable on the middle oven portion, the middle oven portion engaging the bottom oven portion such that the middle oven portion is disposable on the bottom oven portion, the top, middle and bottom oven portions forming an oven closeable to air when the top oven portion is on the middle oven portion and when the middle oven portion is on the bottom oven portion, the middle oven portion being removable from the top and bottom oven portions without destroying the integrity of the middle oven portion, the middle oven portion being removable from the top and bottom oven portions without destroying the integrity of the top and bottom oven portions, the middle oven portion being one-piece;

b) a grill mount, the grill mount being engaged to the middle oven portion;

c) a grate mount, the grate mount being disposed below the grill mount;

d) a rotatable shaft and a tether, the rotatable shaft engaged to the middle oven portion, the tether being engaged between the rotatable shaft and the grate mount, the grate mount being raised and lowered in the middle oven portion when the rotatable shaft is rotated to spool up and to spool out said tether such that the grate mount is incrementally disposable at incrementally different heights relative to the grill mount, the rotatable shaft running horizontally between the grill mount and the grate mount;

e) a manually crankable handle, the manually crankable handle engaged to the rotatable shaft, the manually crankable handle being outside of the middle oven portion, the tether raising and lowering the grate mount and being operated when the manually crankable handle is cranked;

f) wherein the middle oven portion has a top section and a bottom section, wherein said grill mount is disposed at a first height adjacent to the top section of the middle oven portion, wherein said grate mount is disposable at a second height adjacent to the grill mount, wherein said grate mount is disposable at a third height adjacent to the bottom section of said middle oven portion, wherein said grate mount is disposable at a fourth height below the middle oven portion, wherein said first height is greater than said second height, wherein said second height is greater than said third height, wherein said third height is greater than said fourth height; and g) wherein a top section of said middle oven portion forms a first seal with said top oven portion, and wherein a bottom section of said middle oven portion forms a second seal with said bottom oven portion.

\* \* \* \* \*